2,985,652
3-ENOL ESTERS OF 6-HALO-16α-HYDROXY CORTICAL HORMONES

Howard J. Ringold, Carl Djerassi, and Albert Bowers, all of Mexico City, Mexico, assignors to Syntex S.A., Mexico City, Mexico, a corporation of Mexico No Drawing. Filed June 16, 1959, Ser. No. 820,589
Claims priority, application Mexico June 17, 1958
14 Claims. (Cl. 260—239.55)

The present invention relates to novel cyclopentanophenanthrene derivatives.

More particularly, it relates to the novel 3-enol-ethers of the 6-halo and 6α,9α-dihalo analogs of steroidal 16α-hydroxy cortical hormones, and even more specifically, to a 3-alkoxy-$^{3,5}$-pregnadiene-16α,17α,21-triol-20-one oxygenated at C–11 with a β-hydroxyl or keto group, fluorinated or chlorinated at C–6 or at C–6 and C–9, optionally esterified at C–21 or at C–16 and C–21, and which may also be under the form of their 16α,17α-acetals or cyclic ketals.

The new compounds object of the present invention are hormones having anti-inflammatory, glycogenic, thymolytic, anti-androgenic, anti-estrogenic and catabolic activity.

The novel hormones just referred to are illustrated by the following formulas:

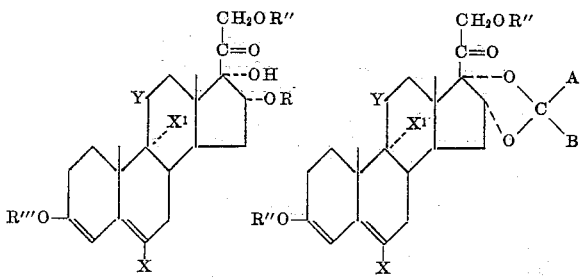

In the above formulas X represents fluorine or chlorine. X' represents hydrogen, fluorine or chlorine. Y represents

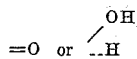

R" represents hydrogen or hydrocarbon carboxylic acyl of up to 12 carbons when R is hydrogen or R and R" represents hydrogen or an acyl group of a hydrocarbon carboxylic acid of up to 12 carbon atoms. R''' represents a lower alkyl group. A and B may be hydrogen or the residue of a hydrocarbon of up to 8 carbon atoms of straight branched, cyclic or mixed aliphatic-cyclic chain, saturated or unsaturated including aromatic groups.

For preparing them we treated a compound of Formula I with a triester of orthoformic acid, preferably with a triester formed with lower aliphatic alcohols of 2–5 carbon atoms; we usually carried out the reaction in mixture with dioxane, in the presence of a p-toluenesulfonic acid and at room temperature, although the solvent, the catalyst and the other reaction conditions can be varied. Thus we produced the desired enol-ethers, represented by Formula II.

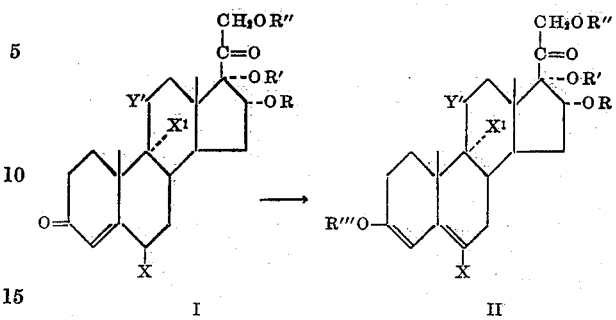

X=F or Cl; X'=H, F or Cl; Y'=β-OH, —OCOF$_3$ or O=; R'=H; R and R"=H or acyl; R, R' may also mean the residue of an acetal or ketal, represented by the following Formula (III):

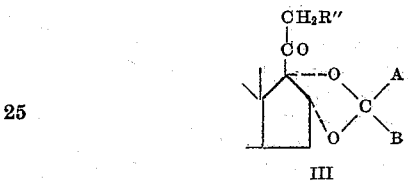

A and B represent a hydrogen atom or any hydrocarbon residue; these starting acetals and ketals have been recently described by Ringold, Zderic, Djerassi and Bowers in a copending United States application Serial No. 819,545, filed June 11, 1959. A and B may also form part of a ring or of a cyclic hydrocarbon, such as cyclohexane for example when the 16α,17α-dihydroxy, steroid is allowed to react with cyclohexane. The other starting materials have also been described in other United States applications (cf. Ringold and Bowers, application Serial No. 762,232, filed September 22, 1958; Ringold, Mancera and Kincl, application Serial No. 753,626, filed August 7, 1958). The esterification of an 11β-hydroxy group with trifluoroacetic acid is hereinafter described.

By the aforementioned enolization of a 6α,9α-dihalo-Δ$^4$-pregnene-11β,16α,17α,21-tetrol - 3,20 - dione, we obtained the respective 3-alkoxy-6,9α-dihalo-Δ$^{3,5}$-pregnadiene-11β,16α,17α,21-tetrol-20-one; by enolization of a 6α-halo-Δ$^4$-pregnene-16α,17α,21-triol-3,11,20-trione we obtained a 3-alkoxy-6-halo-Δ$^{3,5}$-pregnadiene-16α,17α,21-triol-11,20-dione; a 6α,9α-dihalo-Δ$^4$-pregnene-16α,17α,21-triol-3,11,20-trione gave the respective 3-alkoxy-6,9α-dihalo-Δ$^{3,5}$-pregnadiene-16α,17α,21-triol - 11,20-dione; we converted a 16α,17α-cyclic ketal or acetal or such Δ$^4$-compounds into the 16α,17α-cyclic ketal or acetal of their 3-enol-ethers; using the Δ$^4$-compounds under the form of their 21-monoesters (described for the non-ketalized compounds having a fluorine atom at C–6, and for all of the ketals or acetals) we obtained the respective 21-esters of Formula II; by enolization of the 16,21-diesters of the non-ketalized compounds mentioned above, we produced the 16,21-diesters of their 3-enol-ethers.

In the compounds of Formula I having only a halogen atom at C–6 and having an 11β-hydroxyl group, we temporarily protected this hydroxyl group by esterification with an acid which forms esters easy to saponify;

preferably we esterified the 11β-hydroxyl group by reaction with trifluoroacetic anhydride in mixture with dioxane; we converted a 16,21-diesters of a 6α-halo-Δ⁴-pregnene-11β,16α,17α,21-tetrol-3,20-dione into its 11-trifluoroacetate-16,21-diacylate, then into the respective 11-trifluoroacetate-16,21-diacylate of the corresponding 6-halo-3-alkoxy-Δ³,⁵-pregnadiene-11β,16α,17α,21-tetrol-20-one and finally hydrolyzed the esterified groups of the latter; by the esterification of the 11β-hydroxyl group of a 21-ester of a 16α,17α-cyclic ketal or acetal of a 6α-halo-Δ⁴-pregnene-11β,16α,17α,21-tetrol-3,20-dione followed by enolization we obtained the respective 11-trifluoro-acetate-21-acylate of the corresponding 16α,17α-cyclic ketal or acetal of the 3-alkoxy-6-halo-Δ³,⁵-pregnadiene-11β,16α,17α,21-tetrol-20-one; the ester groups of the latter were then hydrolyzed.

The hydrolysis of the ester groups of all of the aforementioned compounds, as well as of the compounds of Formula II, when obtained as the esters, was carried out preferably by treatment with a dilute methanolic solution of potassium hydroxide or sodium methoxide, at low temperature and under an atmosphere of nitrogen.

The primary and secondary hydroxyl groups of the compounds of Formula II were esterified by reaction with the anhydride of any hydrocarbon carboxylic acid of up to 12 carbon atoms, in pyridine solution; the anhydride was derived from an acid saturated or unsaturated, of straight, branched, or cyclic chain, substituted or not with methoxy, halogen or other groups, or having a chain combining these characteristics. Thus, among other 21-mono-esters and 16,21-diesters, respectively, we produced the acetates, propionates, butyrates, hemisuccinates, caproates, enanthates, benzoates, trimethylacetates, acetoxyacetates, phenoxyacetates, cyclopentylpropionates, phenylpropionates and β-chloropropionates.

Our method can also be applied to compounds having a bromine atom at C-6, at C-9 or at both of these positions. We only describe the reactions starting from compounds having the halogen atom at position 6α, but the 6β-halo-isomers can be reacted with the same result.

The following specific examples serve to illustrate the present invention but are not intended to limit the same:

Example I

A solution of 5 g. of 6α,9α-difluoro-Δ⁴-pregnene-11β,16α,17α,21-tetrol-3,20-dione in 100 cc. of dioxane was mixed with 5 cc. of ethyl orthoformate and 200 mg. of p-toluenesulfonic acid and the mixture was stirred for 40 minutes at room temperature; 6.5 cc. of pyridine was then added and the mixture was slowly diluted with water, under stirring, to precipitate the reaction product which was extracted with ethyl acetate. The extract was washed with water, dried over anhydrous sodium sulfate and the ethyl acetate was evaporated; the residue crystallized from methanol containing a few drops of pyridine, to yield 6,9α-difluoro-3-ethoxy-Δ³,⁵-pregnadiene-11β,16α,17α-21-tetrol-20-one.

A mixture of 2.2 g. of the above compound, 10 cc. of pyridine and 1.1 molar equivalents of acetic anhydride was kept for 2 hours at a temperature around 10° C. and then poured into ice cold saturated sodium chloride solution; the precipitate was collected by filtration, washed with water, dried and recrystallized from aqueous methanol containing a little pyridine. There was thus obtained 6,9α-difluoro-3-ethoxy-Δ³,⁵-pregnadiene-11β,16α,17α,21-tetrol-20-one 21-acetate.

Example II

In another experiment, 2 g. of 6,9α-difluoro-3-ethoxy-Δ³,⁵-pregnadiene-11β,16α,17α,21-tetrol-20-one, intermediate in the previous example, was acetylated in pyridine solution with an excess of acetic anhydride, overnight at room temperature; the acetylation product was isolated by following the method described in such example, thus producing 6,9α-difluoro-3-ethoxy-Δ³,⁵-pregnadiene-11β,16α,17α,21-tetrol-20-one 16,21-diacetate.

Example III

In the method of Example I, there was substituted the ethyl orthoformate by the tripropyl ester of orthoformic acid, thus affording 6,9α-difluoro-3-propoxy-Δ³,⁵-pregnadiene-11β,16α,17α,21-tetrol-20-one, which was then converted into its 21-monoacetate, in accordance with such example, or into its 16,21-diacetate, in accordance with Example II.

Example IV

In the method of Example I, there was substituted 6α,9α-difluoro-Δ⁴-pregnene-11β,16α,17α,21-tetrol-3,20-dione by its 21-acetate. There was directly obtained 6,9α-difluoro-3-ethoxy-Δ³,⁵-pregnadiene-11β,16α,17α,21-tetrol-20-one 21-acetate, identical with the final compound of Example I.

Example V

By substituting in the method of Example I 6α,9α-difluoro-Δ⁴-pregnene-11β,16α,17α,21-tetrol-3,20-dione by its 16,21-diacetate, there was directly obtained 6,9α-difluoro-3-ethoxy-Δ³,⁵-pregnadiene-11β,16α,17α,21-tetrol-20-one 16,21-diacetate, identical with the compound obtained in accordance with Example II.

Example VI

By following the method of Example I, 6α-chloro-9α-fluoro-Δ⁴-pregnene-11β,16α,17α,21-tetrol-3,20-dione was converted into 6-chloro-9α-fluoro-3-ethoxy-Δ³,⁵-pregnadiene-11β,16α,17α-tetrol-20-one and then into the 21-acetate of the latter or into the 16,21-diacetate, in accordance with the method of Example II.

Example VII

By substituting in the methods of Examples I and II the acetic anhydride by the anhydride of another hydrocarbon carboxylic acid of up to 12 carbon atoms, or starting in the method of Examples 4 and 5 with other esters different from the acetate, there were obtained the enolized compounds under the form of the corresponding esters; furthermore, there were obtained other enol-ethers by using another triester of orthoformic acid; for example, there were prepared the 21-propionates and 16,21-dipropionates of 6,9α-difluoro-3-butoxy-Δ³,⁵-pregnadiene-11β,16α,17α,21-tetrol-20-one and also the corresponding cyclopentylpropionates and benzoates.

Example VIII

In accordance with the method of Example I, 5 g. of the 16α,17α-(acetaldehyde)-cyclic ketal of 6α-chloro-9α-fluoro-16α-hydroxy-hydrocortisone 21-acetate, namely 6α-chloro-9α-fluoro-16α,17α-methylmethylenedioxy-Δ⁴-pregnene-11β,21-diol-3,20-dione 21-acetate, was treated with ethyl orthoformate. There was thus obtained 6-chloro-9α-fluoro-3-ethoxy-Δ³,⁵-pregnadiene-16α,17α-methylmethylenedioxy-11β,21-diol-20-one 21-acetate.

A mixture of 3 g. of the above compound and 20 cc. of absolute methanol containing 180 mg. of sodium methoxide was stirred at 0° under an atmosphere of nitrogen for 1 hour; the mixture was poured into ice cold saturated sodium chloride solution and the reaction product was extracted with methylene chloride, washed with water, dried over anhydrous sodium sulfate and the solvent was evaporated. Recrystallization of the residue from acetone-hexane furnished the free 6-chloro-9α-fluoro-3-ethoxy-16α,17α-methylmethylenedioxy-Δ³,⁵-pregnadiene-11β,21-diol-20-one.

By treatment of the above compound with an excess of cyclopentylpropionic acid anhydride in pyridine solution, at room temperature for a long period of time, there was obtained its 21-cyclopentylpropionate.

Example IX

In accordance with the previous methods, there were formed the 3-enol-ethers of all of the other 6α-halo (fluoro and chloro) and 6α,9α-dihalo (fluoro and chloro) analogs of 16α-hydroxy-cortisone, of their 21-monoesters and 16,21-diesters, of their 16α,16α-ketals and cyclic acetals, esterified or not at C–21; in the same manner there were formed the 3-enol-ethers of the 6α,9α-dihalo-11β-hydroxy analogs of the corresponding compounds mentioned above.

Example X

A mixture of 2 g. of the acetonide of 6α-chloro-Δ⁴-pregnene-11β,16α,17α,21-tetrol-3,20-dione 21-acetate, 12 cc. of anhydrous dioxane and 4.6 g. of trifluoroacetic anhydride was stirred at room temperature for 18 hours and then poured into ice water; the acylation product was extracted several times with methylene chloride and the combined extract was washed with water to neutral, dried over anhydrous sodium sulfate and evaporated to dryness. The residue was triturated with ether, thus giving the 11-trifluoroacetate-21-acetate of the acetonide of 6α-chloro-Δ⁴-pregene-11β,16α,17α,21-tetrol-3,20-dione, which was used for the subsequent enolization without further purification. In another experiment the tetrol-dione was obtained in pure form by chromatography on neutral alumina.

A solution of 2 g. of the above crude compound in 40 cc. of dioxane was treated with 2 cc. of ethyl orthoformate and 80 mg. of p-toluenesulfonic acid for 40 mintues; 2.6 cc. of pyridine was then added and the reaction product was isolated by the method described in Example I. There was thus obtained the 16α,17α-acetonide of the 11-trifluoroacetate-21-acetate of 6-chloro-3-ethoxy-Δ³,⁵-pregnadiene-11β,16α,17α,21-tetrol-20-one.

A mixture of 1 g. of the above compound and 10 cc. of absolute methanol was treated with a solution of 100 mg. of sodium in 5 cc. of methanol and kept for 1 hour at a temperature around 0° C. and under an atmosphere of nitrogen. After pouring into 100 cc. of aqueous saturated sodium chloride solution the compound was extracted with methylene chloride and the extract was washed with water, dried over anhydrous sodium sulfate and evaporated to dryness. Crystallization of the residue from acetone-hexane yielded the free 16α,17α-acetonide of 6-chloro-3-ethoxy-Δ³,⁵-pregnadiene-11β,16α,17α,21-tetrol-20-one.

By treatment of 500 mg. of the above compound with 10 cc. of pyridine and 1 cc. of cyclopentylpropionic acid anhydride at room temperature for 24 hours, there was obtained the corresponding 21-cyclopentylpropionate. The product was isolated by pouring into water, extracting with methylene chloride, evaporating to dryness the washed extract and recrystallizing the residue from acetone-hexane.

In the same way there was formed the same derivatives of other ketals or acetals including those of formaldehyde, paraldehyde, benzaldehyde, acetophenone, diethylketone, chloroacetone and furfural.

Example XI

Before the enolization, there was protected in the same manner the 11β-hydroxyl group of all of the other starting compounds having an 11β-hydroxyl group and only one halogen atom at C–6α; from a 16,21-diacylate of a 6α-halo-Δ⁴-pregnene-11β,16α,17α,21-tetrol-3,20-dione there was prepared its 11-trifluoroacetate-16,21-diacylate; from a 21-ester of a 16α,17α-cyclic ketal or acetal of a 6α-halo-Δ⁴-prenegne-11β,16α,17α,21-tetrol-3,20-dione there was prepared its 11-trifluoroacetate-21-acylate; these compounds were then subjected to the reaction with the triester of orthoformic acid; the ester groups of the enolized compounds were subsequently hydrolyzed; the primary and secondary hydroxyl groups of the free compounds were re-esterified by reaction with the anhydride of any carboxylic acid of up 12 carbon atoms, including acetic, cyclopentlypropionic acid benzoic.

For example, there was formed the 11-trifluoroacetate-16,21-diacetate of 6α-fluoro-Δ⁴-pregnene-11β,16α,17α,21-tetrol-3,20-dione; the latter was converted into the 11-trifluoroacetate-16,21-diacetate of 6-fluoro-3-ethoxy-Δ³,⁵-pregnadiene-11β,16α,17α,21-tetrol-20-one by reaction with ethyl orthoformate; the ester groups were hydrolized by reaction with sodium methoxide in methanol solution to produce the free hydroxyl groups; the free 6-fluoro-3-ethoxy-Δ³,⁵-pregnadiene-11β,16α,17α,21-tetrol-20-one was treated with an excess of propionic anhydride in pyridine solution, to produce the 16,21-dipropionate of such compound.

We claim:

1. A compound of the following formula:

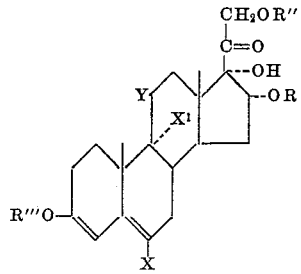

wherein X is selected from the group consisting of fluorine and chlorine; X' is selected from the group consisting of hydrogen, fluorine, and chlorine, R'' is selected from the group consisting of hydrogen and a hydrocarbon carboxylic acyl group of up to 12 carbons when R is hydrogen, and R and R'' are both selected from the group consisting of hydrogen and a hydrocarbon carboxylic acyl group of up to 12 carbon atoms, R''' is lower alkyl and Y is selected from the group consisting of $$=O \text{ and } \begin{array}{c}OH\\ /\\ ..H\end{array}$$

2. A compound of the following formula:

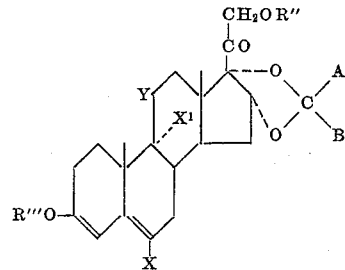

wherein X is selected from the group consisting of fluorine and chlorine, X' is selected from the group consisting of hydrogen, fluorine and chlorine, R'' is selected from the group consisting of hydrogen and a hydrocarbon carboxylic acid acyl group of up to 12 carbon atoms, Y is selected from the group consisting of $$=O \text{ and } \begin{array}{c}OH\\ /\\ ..H\end{array}$$

R''' is lower alkyl, and A and B are selected from the group consisting of hydrogen and hydrocarbon of up to 8 carbons.

3. 6,9α-difluoro-3-ethoxy-Δ³,⁵-pregnadien-11β,16α,17α,21-tetrol-20-one.

4. 6,9α-difluoro-3-ethoxy-Δ³,⁵-pregnadien-11β,16α,17α,21-tetrol-20-one 21-acetate.

5. 6,9α-difluoro-3-ethoxy-Δ³,⁵-pregandien-11β,16α,17α,21-tetrol-20-one 16,21-diacetate.

6. 6,9α-difluoro-3-propoxy-Δ³,⁵-pregnadien-11β,16α,17α,21-tetrol-20-one.

7. 6,9α-difluoro-3-propoxy-Δ³,⁵-pregnadien-11β,16α,17α,21-tetrol-20-one 21-acetate.

8. 6,9α - difluoro - 3 - propoxy - $\Delta^{3,5}$-pregnadien-11β,16α,17α,21-tetrol-20-one 16,21-diacetate.

9. 6 - chloro - 9α - fluoro-3-ethoxy - $\Delta^{3,5}$-pregnadien 11β,16α,17α,21-tetrol-3,20-dione.

10. 6 - chloro - 9α - fluoro-3-ethoxy - $\Delta^{3,5}$-pregnadien 11β,16α,17α,21-tetrol-3,20-dione 21-acetate.

11. 6 - chloro - 9α - fluoro - 3-ethoxy-$\Delta^{3,5}$-pregnadien 11β,16α,17α,21-tetrol-3,20-dione 16,21-diacetate.

12. 6 - chloro - 9α - fluoro-3-ethoxy-$\Delta^{3,5}$-pregnadien 16α,17α-methylmethylenedioxy-11β,21-diol-20-one.

13. 6 - chloro - 9α - fluoro-3-ethoxy-$\Delta^{3,5}$-pregnadien 16α,17α-methylmethylenedioxy-11β,21-diol-20 - one 21 acetate.

14. The 16α,17α-acetonide of 6 - chloro-3 - ethoxy $\Delta^{3,5}$-pregnadien-11β,16α,17α,21-tetrol-20-one.

References Cited in the file of this patent
UNITED STATES PATENTS 2,838,548   Margerlein _____ June 10, 1958